United States Patent
Lee et al.

(10) Patent No.: US 9,440,679 B2
(45) Date of Patent: Sep. 13, 2016

(54) LIGHTWEIGHT ROOF FOR VEHICLE

(71) Applicant: Hyundai Motor Company, Seoul (KR)

(72) Inventors: Hae Hoon Lee, Goyang-si (KR); Jeong Min Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/668,169

(22) Filed: Mar. 25, 2015

(65) Prior Publication Data
US 2016/0159404 A1 Jun. 9, 2016

(30) Foreign Application Priority Data
Dec. 4, 2014 (KR) ........................ 10-2014-0172818

(51) Int. Cl.
| | |
|---|---|
| B62D 25/06 | (2006.01) |
| B62D 29/04 | (2006.01) |
| B62D 29/00 | (2006.01) |
| B62D 27/02 | (2006.01) |

(52) U.S. Cl.
CPC ............ *B62D 25/06* (2013.01); *B62D 27/023* (2013.01); *B62D 29/00* (2013.01); *B62D 29/043* (2013.01)

(58) Field of Classification Search
CPC .... B62D 25/06; B62D 27/023; B62D 29/00; B62D 29/43
USPC ........................................ 296/210, 216, 201
See application file for complete search history.

(56) References Cited

U.S. PATENT DOCUMENTS

| | | | | | |
|---|---|---|---|---|---|
| 3,350,249 | A | * | 10/1967 | Gregoire | B29B 15/10 156/253 |
| 5,118,335 | A | * | 6/1992 | Claassen | C03B 27/0442 65/288 |
| 5,681,076 | A | * | 10/1997 | Yoshii | B62D 25/06 296/104 |
| 5,995,272 | A | * | 11/1999 | Patz | B32B 17/10009 359/265 |
| 6,502,895 | B2 | * | 1/2003 | Taylor | B62D 31/02 296/178 |
| 6,543,976 | B1 | * | 4/2003 | Malofsky | B29C 65/564 156/275.7 |
| 6,619,731 | B2 | * | 9/2003 | Rieger | B62D 29/048 296/210 |
| 7,077,462 | B1 | * | 7/2006 | De Gaillard | B60J 7/022 296/193.04 |

(Continued)

FOREIGN PATENT DOCUMENTS

| | | |
|---|---|---|
| EP | 2 327 545 A1 | 6/2011 |
| JP | 2005-035336 A | 2/2005 |

(Continued)

*Primary Examiner* — Pinel Romain
(74) *Attorney, Agent, or Firm* — Mintz Levin Cohn Ferris Glovsky and Popeo, P.C.; Peter F. Corless

(57) ABSTRACT

A roof for a vehicle is provided that includes a roof frame and a reinforcement frame that is disposed on an upper part of the roof frame, shaped to correspond to an upper surface of the roof frame, and provided with a bush unit formed integrally with a bolting mechanism, respectively, to be connected to the roof frame. In addition, a reinforcement fiber tow is processed to correspond to a shape of the roof frame through the bush unit. A roof panel that is formed as a plate shape to cover the roof frame is disposed at an upper end of the reinforcement frame to be connected thereto.

9 Claims, 3 Drawing Sheets

(56) References Cited

U.S. PATENT DOCUMENTS

| | | | | |
|---|---|---|---|---|
| 7,128,365 B2 * | 10/2006 | Kiesewetter | ........... | B62D 25/06 296/191 |
| 7,165,806 B2 * | 1/2007 | Osterberg | .............. | B62D 25/06 296/203.03 |
| 7,189,450 B2 * | 3/2007 | Biewer | ............... | B29C 44/1233 296/210 |
| 7,972,676 B2 * | 7/2011 | Kleba | ................... | B32B 15/095 156/242 |
| 8,167,364 B2 * | 5/2012 | Burns | .................... | B29C 70/74 296/187.01 |
| 8,322,771 B2 * | 12/2012 | Mihai | ................ | B29C 66/74283 29/897.2 |
| 8,662,573 B2 * | 3/2014 | Vantrease | ............. | B62D 25/06 296/203.03 |
| 8,740,292 B2 * | 6/2014 | Kishi | ..................... | B62D 25/06 296/203.01 |
| 9,067,622 B2 * | 6/2015 | Hennion | ................ | B62D 25/06 |
| 2001/0033096 A1 * | 10/2001 | Hanyu | ................... | B62D 21/15 296/203.01 |
| 2004/0075302 A1 * | 4/2004 | Chon | ................ | B32B 17/10045 296/210 |
| 2004/0104603 A1 * | 6/2004 | Albert | .................... | B62D 25/06 296/210 |

FOREIGN PATENT DOCUMENTS

| | | |
|---|---|---|
| KR | 10-1996-0013919 A | 5/1996 |
| KR | 20-1997-0013395 U | 4/1997 |
| KR | 1998-031349 | 8/1998 |
| KR | 20-1998-0047877 U | 9/1998 |
| KR | 2008-0029916 A | 4/2008 |
| KR | 2013-0090686 A | 8/2013 |

* cited by examiner

LIGHTWEIGHT ROOF FOR VEHICLE

CROSS-REFERENCE TO RELATED APPLICATION

The present application claims priority to Korean Patent Application No. 10-2014-0172818, filed Dec. 4, 2014, the entire contents of which is incorporated herein for all purposes by this reference.

BACKGROUND (a) Technical Field

The present invention relates to a roof for a vehicle, and more particularly, to a roof for a vehicle having reduced weight and improved rigidity by forming a roof panel from plastic material.

(b) Description of the Related Art

Recently, a fuel ratio of an engine has been improved to discharge less carbon dioxide to protect the environment. Specially, a reduced weight of a vehicle has been proposed as for a method of improving the fuel ratio. Generally, a vehicle body holds about 30% of a total weight of a vehicle and thus reducing the weight of a vehicle body has a substantial effect on the total vehicle weight. In particular, a roof for a vehicle holds a substantial amount of a total weight of a vehicle body. When the roof panel is made of steel to ensure a safety of a roof panel for a vehicle, the rigidity of the roof panel is ensured, however, the weight of a vehicle body is increased thus decreasing the fuel ratio.

Therefore, recently, a vehicle body has been made of Carbon Fiber Reinforced Plastic (CFRP) to increase rigidify of a vehicle body and also reduce a weight thereof. When the roof panel is made of CFRP, a bush is embedded therein for forming carbon fiber as a panel shape and a bolt is inserted separately to fix the roof panel to a roof frame. However, the bush for forming the carbon fiber and the bolt for fixing the roof panel to a roof frame are provided separately thus increasing the number of procedures and a space between the bolt and the bush is formed thus decreasing rigidity of a part to which the bolt is fastened.

The description provided above as a related art of the present invention is merely for helping in understanding the background of the present invention and should not be construed as being included in the related art known by those skilled in the art.

SUMMARY

The present invention provides a roof for a vehicle having reduced weight, rigidity is increased and structural rigidity is enforced to ensure connection rigidity, by forming a roof panel from carbon fiber reinforcement plastic material.

In one aspect, the present invention provides a roof for a vehicle that may include: a roof frame; a reinforcement frame disposed on an upper part of the roof frame, shaped to correspond to an upper surface of the roof frame, and provided with a bush unit formed integrally with a bolting mechanism, respectively, to be connected to the roof frame, and in which a reinforcement fiber tow is processed to correspond to a shape of the roof frame through the bush unit; and a roof panel formed as a plate shape to cover the roof frame and disposed at an upper end of the reinforcement frame to be connected thereto.

A plurality of fastening grooves may be formed along an outer circumference on an upper surface of the roof frame and a plurality of bush units may be disposed on the reinforcement frame to correspond to the plurality of fastening grooves of the roof frame, and the bolting mechanism may be fastened to the respective fastening groove to connect the roof frame and the reinforcement frame.

A winding groove indented along an outer circumference of the bush unit may be formed between an upper end and a lower end of the bush unit, and the bolting mechanism may pass through from the upper end to the lower end to be connected integrally thereto. A plurality of bush units may be disposed along an outer circumference of the reinforcement frame to wind the reinforcement fiber tow around the winding grooves of the plurality of bush units to be connected thereto.

An installation groove formed by an upper surface of the upper end of the bush unit being indented downwardly may be formed on the upper end of the bush unit and an insertion hole penetrated vertically may be formed in the installation groove. The bolting mechanism may include a head portion, a body portion extended downwardly from the head portion and a nut portion connected to a lower end of the body portion. In particular, the head portion may be inserted into the installation groove of the bush unit, a lower end of the body portion may be exposed to a lower part of the bush unit after the body portion passes through the insertion bore, and the nut portion may be connected to the lower part of the body portion.

A reception groove formed by a lower surface of the lower end of the bush unit being indented upwardly may be formed on the lower end of the bush unit and the nut portion may be inserted into the reception groove. The roof panel may be made of plastic material and may be bonded to the reinforcement frame using a bonding agent to be fixed thereto. A weather strip may be disposed between the roof panel and the reinforcement frame to watertight (e.g., sealed) a gap between the roof panel and the reinforcement frame. The reinforcement fiber tow may be made of reinforcement fiber that includes carbon fiber and glass fiber.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

It should be understood that the appended drawings are not necessarily to scale, presenting a somewhat simplified representation of various exemplary features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of a method for a cold start of a vehicle of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a roof for a vehicle according to exemplary embodiments of the present invention will be described with reference to the accompanying drawings.

Figure 1:
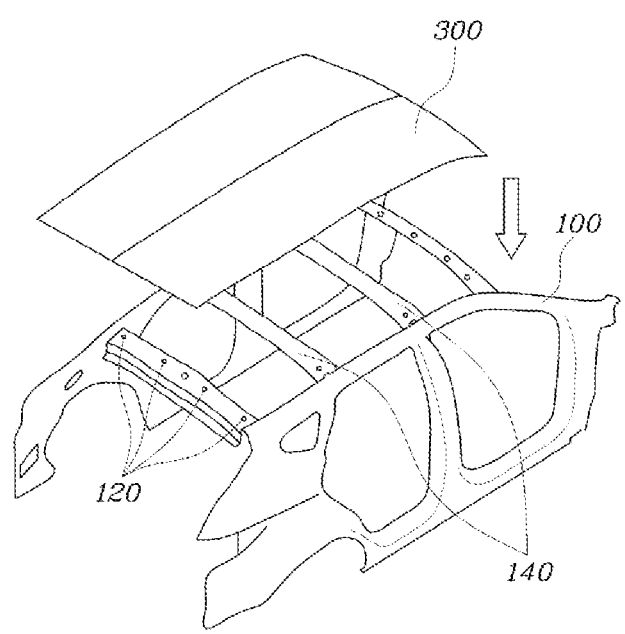
FIG. 1 is an exemplary view illustrating a roof for a vehicle according to an exemplary embodiment of the present invention.
Figure 2:
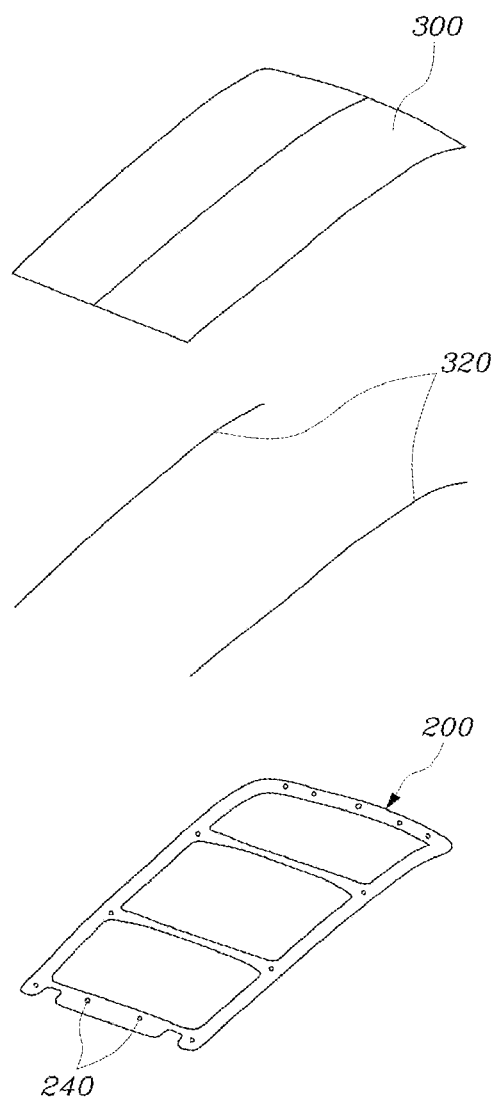
FIG. 2 is an exemplary detailed view illustrating a roof for a vehicle as shown in FIG. 1 according to an exemplary embodiment of the present invention.
Figure 3:
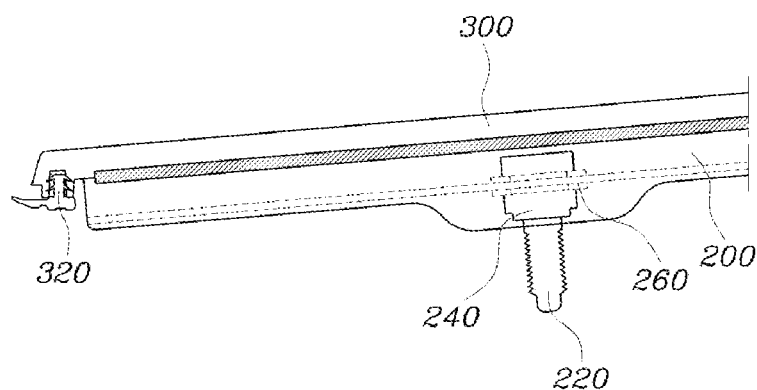
FIG. 3 is an exemplary side view illustrating a roof for a vehicle according to an embodiment of the present invention.
Figure 4:
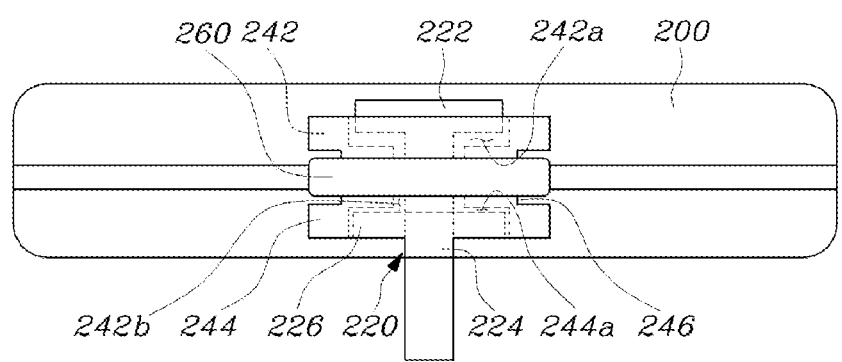
FIG. 4 is an exemplary view illustrating reinforcement frame of the roof for a vehicle as shown in FIG. 1 according to an exemplary embodiment of the present invention.

FIG. 1 is an exemplary view illustrating a roof for a vehicle according to an exemplary embodiment of the present invention, FIG. 2 is an exemplary detailed view illustrating a roof for a vehicle as shown in FIG. 1, FIG. 3 is an exemplary side view illustrating a roof for a vehicle according to an exemplary embodiment of the present invention, and FIG. 4 is an exemplary view illustrating reinforcement frame of the roof for a vehicle as shown in FIG. 1.

As shown in FIGS. 1 and 2, a roof for a vehicle according to an exemplary embodiment of the present invention may include: a roof frame 100; a reinforcement frame 200 disposed on an upper part of the roof frame 100, shaped to correspond to an upper surface of the roof frame 100, and including a bush unit 240 formed integrally with a bolting mechanism 220, respectively, to be connected to the roof frame 100, and in which a reinforcement fiber tow 260 is processed to correspond to a shape of the roof frame 100 through the bush unit 240; and a roof panel 300 formed as a plate shape to cover the roof frame 100 and disposed at an upper end of the reinforcement frame 200 to be connected thereto.

In particular, the roof frame 100 may connect a front pillar, a medium pillar (e.g., a pillar disposed between the front and rear pillar), and a rear pillar, as shown in FIG. 1, and may be formed in a substantially rectangular shape as a vehicle body frame consisting of an upper end of a vehicle body. Further, a separate rigid frame 140 disposed across both roof frames may be provided to supplement rigidity and reduce vibration of the roof frame 100.

The reinforcement frame 200 and the roof panel 300 may be connected to the roof frame 100. The reinforcement frame 200 of the present invention may ensure sufficient rigidity therein such that the reinforcement fiber tow 260 is embedded therein through the bush unit 240 along an outer circumference. The reinforcement fiber tow 260 may be formed to include carbon fiber and glass fiber. Particularly, the reinforcement fiber tow 260 may be made of reinforcement fiber having high elasticity and strength to ensure rigidity of the reinforcement frame 200 when the reinforcement fiber tow is embedded into the reinforcement frame 200.

Furthermore, the bolting mechanism 220 may be formed integrally with the bush unit 240 according to an exemplary embodiment of the present invention to allow the bolting mechanism 220 may be supported by the reinforcement fiber tow 260 wound around the bush unit 240 to increase a connection strength. The bolting mechanism 220 and the bush unit 240 may be formed integrally to be manufactured by simply the bush unit 240 into the reinforcement frame 200.

The roof panel 300 may be connected to an upper part of the reinforcement frame 200 to close an upper end of a vehicle body and the reinforcement frame 200 may be installed on the roof frame 100 to connect and fix the roof panel 300 to the roof frame 100, thereby creating a roof for a vehicle. In particular, a plurality of fastening grooves 120 may be formed along an outer circumference on an upper surface of the roof frame 100 and a plurality of bush units 240 may be disposed on the reinforcement frame 200 to correspond to the plurality of fastening grooves 120 of the roof frame 100, and the bolting mechanism 220 may be fastened to the respective fastening groove 120 to connect the roof frame 100 and the reinforcement frame 200.

As described above, a plurality of fastening grooves 120 may be formed along an outer circumference on the roof frame 100 and a plurality of bush units 240 of the reinforcement frame 200 may be formed to correspond to the fastening grooves 120 to firmly fasten the reinforcement frame 200 and the roof frame 100. As shown in FIG. 1, the fastening grooves 120 may be formed at a narrower space at a front and rear parts of the roof frame 100, and the fastening grooves may be formed at a part of the roof frame to which the rigid frame 140 is connected to firmly connect the reinforcement frame 200 to the roof frame 100 and the rigid frame 140 using the bolting mechanism 220 of the bush unit 240.

Moreover, a winding groove 246 indented along an outer circumference of the bush unit may be formed between an upper end 242 and a lower end of the bush unit 240, and the bolting mechanism 220 may pass through from the upper end 242 to the lower end 244 to be connected integrally thereto. In other words, the bush unit 240 may be formed to be a cylinder shape wherein the winding groove 246 indented along an outer circumference of the bush unit may be formed between the upper end 242 and the lower end 244 to wind a reinforcement fiber tow 260 around the winding groove 246. Further, the bolting mechanism 200 may pass through from the upper end 242 to the lower end 244 to be connected integrally thereto to connect the reinforcement frame 200 and the bush unit 240 to the roof frame 100 when the bolting mechanism 200 is connected to the roof frame 100.

Further, the winding groove 246 may be formed around the bush unit 240 and the reinforcement fiber tow 260 may be wound around the winding groove 246 of the bush unit 240 (e.g., a first bush unit) and may be extended to another bush unit 240 (e.g., a second bush unit) to be wound around the winding groove thereof to maintain a firm fixing state between the bush units 240 using the reinforcement fiber tow 260. In other words, the reinforcement fiber tow 260 is wound around the bush units 240 to form a firm connection between each bush unit 240. In particular, as the reinforcement fiber tow 260 is wound around the winding groove 246, the reinforcement fiber tow 260 is prevented from departing from the bush unit 240 and as a result the reinforcement frame 200 may be more easily mold-processed.

Further, as the bolting mechanism 220 is connected integrally to the bush unit 240, the bolting mechanism 200 may be inserted into the reinforcement frame 200 when the bush unit 240 is inserted into the reinforcement frame 200, thus reducing manufacturing procedures, and the reinforcement fiber tow 260 surrounds and fixes the bush unit 240 and the bolting mechanism 220, thus ensuring rigidity of the bolting mechanism.

The bush unit 240 may be formed as a plurality along an outer circumference of the reinforcement frame 200 and the bush units may be connected by the reinforcement fiber tow 260 wound around the winding grooves 246 of the plurality of bush units 240. As described above, a plurality of bush units 240 may be disposed along an outer circumference of the reinforcement frame 200 to distribute the reinforcement fiber tow 260 on the reinforcement frame 200.

Additionally, the reinforcement fiber tow 260 may be wound around the winding groove 246 of one bush unit 240 (e.g., a first bush unit) and then may be extended to another bush unit 240 (e.g., a second bush unit) to be consecutively wound around the winding groove 246 thereof, thereby connecting a plurality of bush units 240 through one stroke of the reinforcement fiber tow. As a result, the rigidity of the reinforcement frame 200 may be ensured.

In more a detailed description of the bush unit 240, as shown in FIGS. 3 and 4, an installation groove 242a formed by an upper surface of the upper end of the bush unit being indented downwardly may be formed on the upper end 242 of the bush unit 240 and an insertion bore 242b penetrated vertically may be formed in the installation groove 242a. The bolting mechanism 220 may include a head portion 222, a body portion 224 extended downwardly from the head portion 222 and a nut portion 226 connected to a lower end of the body portion 224.

The head portion 222 of the bolting mechanism 220 may be inserted into the installation groove 242a of the bush unit 240 and thus the bolting mechanism may be prevented from separating (e.g., sliding or departing) downwardly and the head portion 222 may be housed within the installation groove 242a, thus reducing an installation space. The body portion extended from the head portion 222 may pass through the insertion bore 242b to be connected thereto wherein screw-threads may be formed on an peripheral surface of the body portion 224 and corresponding screw-threads that engage with the screw-threads may be formed on an inner peripheral surface of the insertion bore 242b and thus the body portion may be screw-connected to the bush unit. As described above, as the body portion 224 passes through the insertion bore 242b, when the lower end of the body portion 224 is exposed to a lower part of the bush unit 240, the nut 226 may be connected to the lower part to prevent the bolting mechanism 220 from separating from the bush unit 240.

In particular, a reception groove 244a formed by a lower surface of the lower end of the bush unit indented upwardly may be formed on the lower end 244 of the bush unit 240 and the nut portion 226 may be inserted into the reception groove 244a. As the nut portion 226 is inserted into the reception groove 244a, the bolting mechanism 220 may be prevented from being separated upwardly from the bush unit 240. Further, the nut portion 226 may be inserted into the reception groove 244a not to be exposed exterior, thus reducing an installation space.

Meanwhile, the roof panel 300 may be made of plastic and be bonded to the reinforcement frame 200 using a bonding agent. In other words, the roof panel 300 may be made of plastic, that is, Carbon Fiber Reinforced Plastic (CFRP) to ensure rigidity and reduce weight thereof. The roof panel 300 may be bonded and firmly fixed to the reinforcement frame 200 using a bonding agent. In particular, the roof panel 300 and the reinforcement frame 200 may be connected using a separate bolting. Further, a weather strip 320 may be disposed between the roof panel 300 and the reinforcement frame 200 to seal (e.g., watertight) a gap there between.

As described above, the watertight performance between the roof panel 300 and the reinforcement frame 200 may be ensured through the use of the weather strip 320. Accordingly, connection property decrease due to corrosion caused from when moisture is infiltrated into the gap between the roof panel 300 and the reinforcement frame 200 may be prevented and durability may be ensured.

According to a roof for a vehicle configured as described above, the roof panel may be made of carbon fiber reinforced plastic to reduce weight thereof and ensure rigidity. Particularly, the bush unit 240 formed integrally with the bolting mechanism 220 may be inserted into the reinforcement frame 200 to be connected to the roof panel 300 and the roof panel 300 may be fixed to the roof frame 100 through the reinforcement frame 200 to ensure connection rigidity wherein reinforcement fiber tow may be embedded into the reinforcement frame 200 to ensure rigidity.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A roof for a vehicle, comprising:
   a roof frame;
   a reinforcement frame disposed on an upper part of the roof frame, shaped to correspond to an upper surface of the roof frame, and provided with a bush unit formed integrally with a bolting mechanism, respectively, to be connected to the roof frame, and in which a reinforcement fiber tow is processed to correspond to a shape of the roof frame through the bush unit;
   a roof panel formed as a plate shape to cover the roof frame and disposed at an upper end of the reinforcement frame to be connected thereto; and a winding groove indented along an outer circumference of the bush unit and formed between an upper end and a lower end of the bush unit, wherein the bolting mechanism passes through from the upper end to the lower end to be connected integrally thereto.

2. The roof of claim 1, further comprising:

a plurality of fastening grooves formed along an outer circumference on an upper surface of the roof frame; and a plurality of bush units disposed on the reinforcement frame to correspond to the plurality of fastening grooves of the roof frame, wherein the bolting mechanism is fastened to each respective fastening groove to connect the roof frame and the reinforcement frame.

3. The roof of claim 1, further comprising:

a plurality of bush units are disposed along an outer circumference of the reinforcement frame to wind the reinforcement fiber tow around the winding grooves of the plurality of bush units to be connected thereto.

4. The roof of claim 1, further comprising:

an installation groove formed by an upper surface of the upper end of the bush unit being indented downwardly and formed on the upper end of the bush unit; and an insertion bore penetrated vertically and formed in the installation groove.

5. The roof of claim 4, wherein the bolting mechanism includes a head portion, a body portion extended downwardly from the head portion and a nut portion connected to a lower end of the body portion, the head portion is inserted into the installation groove of the bush unit, a lower end of the body portion is exposed to a lower part of the bush unit after the body portion passes through the insertion bore, and the nut portion is connected to the lower part of the body portion.

6. The roof of claim 5, further comprising:

a reception groove formed by a lower surface of the lower end of the bush unit being indented upwardly is formed on the lower end of the bush unit and the nut portion is inserted into the reception groove.

7. The roof of claim 1, wherein the roof panel is made of plastic material and is bonded and fixed to the reinforcement frame using a bonding agent.

8. The roof of claim 1, wherein a weather strip is disposed between the roof panel and the reinforcement frame to seal a gap between the roof panel and the reinforcement frame.

9. The roof of claim 1, wherein the reinforcement fiber tow is made of reinforcement fiber that includes carbon fiber and glass fiber.

* * * * *